United States Patent [19]

Velez

[11] Patent Number: 5,784,237

[45] Date of Patent: Jul. 21, 1998

[54] CONTROL METHOD AND APPARATUS FOR POWER DISTRIBUTION NETWORK

[75] Inventor: Andrew M. Velez, Gurnee, Ill.

[73] Assignee: S&C Electric Company, Chicago, Ill.

[21] Appl. No.: 758,406

[22] Filed: Nov. 29, 1996

[51] Int. Cl.$^6$ .................................................. H02H 3/00
[52] U.S. Cl. .............................. 361/62; 361/64; 361/66; 361/115
[58] Field of Search .................... 361/62, 63, 64, 361/66, 115

[56] References Cited

U.S. PATENT DOCUMENTS 5,341,268  8/1994  Ishiguro ................................. 361/62

Primary Examiner—Jeffrey A. Gaffin
Assistant Examiner—Stephen Jackson
Attorney, Agent, or Firm—James V. Lapecek

[57] ABSTRACT

A control method and apparatus is provided for isolating network faults via the communication between neighboring network locations and the control of sectionalizing switches at the network locations. Control apparatus is provided at particular network locations which responds to detected fault conditions and communicates the detected fault condition to the control apparatus at neighboring network locations. The appropriate control apparatus, in response to the information received from neighboring network locations, opens a sectionalizing switch to isolate the fault condition. In one particular arrangement, each control apparatus that detects a fault condition sends a signal to appropriate source-side, neighboring control apparatus to inhibit the source-side control apparatus from opening their respective sectionalizing switches. Further, any control apparatus that detected a fault condition and that does not receive an inhibiting signal, controls its sectionalizing switch to open. Inn a specific arrangement, the control apparatus that opens its sectionalizing switch also sends a signal to predetermined neighboring load-side control apparatus to open their sectionalizing switches, so as to prevent feeding into a fault condition after network restoration via a different path or source.

7 Claims, 3 Drawing Sheets

CONTROL METHOD AND APPARATUS FOR POWER DISTRIBUTION NETWORK

BACKGROUND OF THE INVENTION

1. Field of the Invention

The present invention relates generally to the control of power distribution networks and more particularly to a control method and apparatus for isolating network faults via the communication between neighboring network locations and the control of sectionalizing switches at the network locations.

2. Description of Related Art

In electrical power distribution systems, customers and users are supplied with a electricity via a distribution network. The network is commonly configured such that power may be provided to the users from more than one system network path or more than one source. This is done so that the loss of one source does not disable the entire network. Further, if a fault condition occurs anywhere in the network, the fault may be isolated via sectionalizing while maintaining power delivery to the users who are not in the immediate vicinity of the location of the fault, i.e. the faulted section.

In one arrangement, communications is provided between a master station and particular points in the network. In this way, information can be obtained corresponding to fault location, the lockout condition of particular breakers, and the voltage and current at the particular locations. Control of the system network is possible via the remote operation of sectionalizing devices (distribution switches) by the master station. A fault detection method and apparatus for the remote locations that is useful with a master station is shown in U.S. Pat. No. 5,303,112.

In an arrangement without a master station, reclosing into faults and sectionalizing is accomplished via the counting of reclosing cycles. For example, sectionalizing devices are arranged such that each device has one less count to open the device than the adjacent upstream sectionalizing device. Obviously, this limits the number of sectionalizing devices and also requires a large number of reclosing cycles for the main line protection device such as a circuit breaker with recloser.

In the arrangement illustrated in U.S. Pat. No. 5,341,268, a main controller at a substation of a network sends a request signal to each of various section controllers located throughout the network when the main controller detects a fault. Each of the section controllers individually performs fault detection and judges whether its associated section switch is dividing the distribution line between faulty and normal line sections on the basis of fault detection signals from other section controllers. If the section controller decides that it is dividing the line between faulty and normal line sections, the section controller opens its associated section switch. In one embodiment, the individual section controllers receive fault detection information from the power-supply side section controller and the load side section controller, the section controller maintaining its respective section switch closed if it receives a fault detection signal from its power-supply side section controller and its load side section controller, or opening its respective section switch if it receives a fault detection from its power-supply side section controller and a non-fault detection from its load side section controller. The communication between the section controllers is synchronized by the main controller. Specifically, the main controller sends out the request signal after a fault is detected at the substation, whereupon each of the section controllers responds by sequentially outputting a fault detection signal.

In the network system available from Kearney (a Kearney-National Company, Tucker GA), FILS (Fault Interrupting Line Sectionalizer) network circuitry automatically finds the faulted section of the feeder/line and then isolates it (via use of directional fault-indicating relays). Specifically, two switches that share a common section of the feeder/line communicate with one another via a low-voltage control cable. If both ends of the feeder/line have current flowing in the same direction, the two switches stay closed. If the feeder/line has current flowing into it from both directions, then both switches open simultaneously. The network circuitry controls fault interrupter switches to interrupt the fault current and isolate the bad section of feeder/line. In another network arrangement of this FILS system, operation is described as two adjacent sets of FILS switches determining if the fault is between them or not, opening if it is, and remaining closed if it is not.

Thus, while the prior art arrangements may be generally useful to detect faults, where a master station and remote terminal units are utilized with fault detection logic, the communications and protocol to restore a network after a fault are complicated and dependent on the number of sources and circuit configuration at the time of the fault. Also, where a master station is not utilized, the arrangements of the prior art to accomplish sectionalizing and restoration of a network are complicated and time consuming, requiring sequential closing of the various devices at timed intervals, or being inapplicable to all but the very simplest of circuit network configurations.

SUMMARY OF THE INVENTION

Accordingly, it is a principal object of the present invention to provide an efficient control method and apparatus for isolating network faults via the communication between neighboring network locations and the control of sectionalizing switches at the network locations, the communication entailing the sending of open inhibit signals to upstream (source-side) neighbor network locations by each network location that detects a fault.

It is another object of the present invention to provide control apparatus at particular points in a distribution network that detect fault conditions and inhibit the opening of appropriate neighboring control apparatus so as to control sectionalizing switches at the particular locations to isolate the detected fault conditions.

It is a further object of the present invention to provide a method for isolating fault conditions that are detected in an electrical power distribution network via the inhibiting of upstream (source-side) sectionalizing switch locations and the opening of sectionalizing switch locations that sense a fault and do not receive inhibiting signals and the opening of sectionalizing switch locations that are identified as downstream (load-side) neighbors to the opening sectionalizing switch locations.

These and other objects of the present invention are efficiently achieved by the provision of a control method and apparatus for isolating network faults via the communication between neighboring network locations and the control of sectionalizing switches at the network locations. Control apparatus is provided at particular network locations which responds to detected fault conditions and communicates the detected fault condition to the control apparatus at neighboring network locations. The appropriate control apparatus, in response to the information received from neighboring network locations, opens a sectionalizing switch to isolate the fault condition. In one particular arrangement, each control apparatus that detects a fault condition sends a signal to appropriate source-side, neighboring control apparatus to inhibit the source-side control apparatus from opening their respective sectionalizing switches. Further, any control apparatus that detected a fault condition and that does not receive an inhibiting signal, controls its sectionalizing switch to open. In a specific arrangement, the control apparatus that opens its sectionalizing switch also sends a signal to predetermined neighboring load-side control apparatus to open their sectionalizing switches, so as to prevent feeding into a fault condition after network restoration via a different path or source.

BRIEF DESCRIPTION OF THE DRAWING

The invention, both as to its organization and method of operation, together with further objects and advantages thereof, will best be understood by reference to the specification taken in conjunction with the accompanying drawing in which.

DETAILED DESCRIPTION

Figure 1:
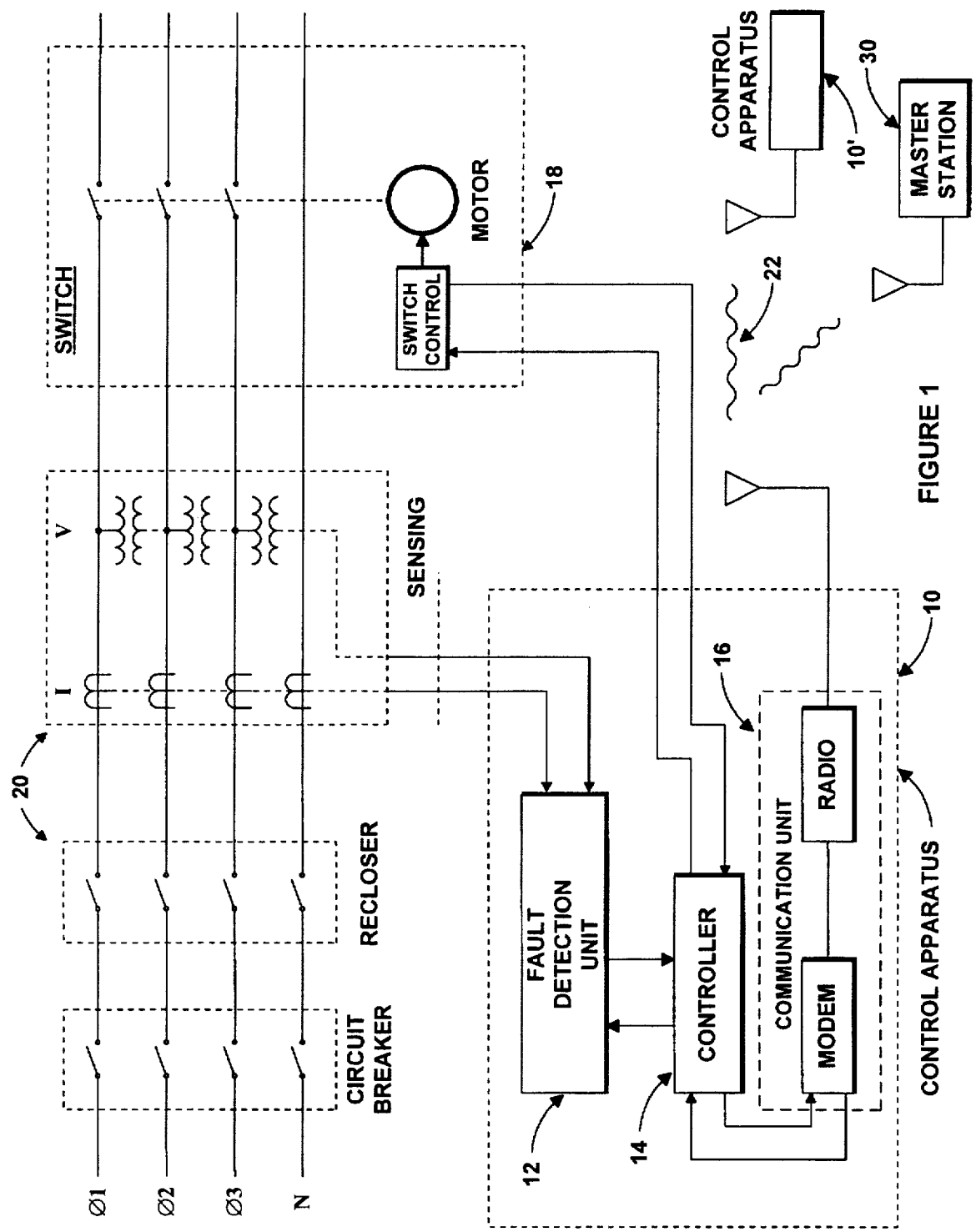
FIG. 1 is a block diagram representation of control apparatus in accordance with the principles of the present invention illustrated with an electrical power distribution system.

Referring now to FIG. 1, an illustrative control apparatus 10 in accordance with the principles and features of the present invention is utilized in conjunction with other control apparatus such as 10' in a power distribution network, portions of which are illustrated generally at 20, to isolate fault conditions as will be explained in more detail hereinafter. The control apparatus includes a fault detection unit 12, a controller 14, and a communications unit 16. In a specific embodiment, the fault detection unit 12 operates to detect faults in accordance with the method and apparatus as set forth in U.S. Pat. No. 5,303,112, which is hereby incorporated by reference for all purposes.

The control apparatus 10 selectively controls the opening and closing of a switch 18 which is utilized as a sectionalizing switch in the power distribution network 20. The communications unit 16 of the control apparatus 10 communicates with other control apparatus (e.g. 10') located at particular points in the power distribution network 20 via a suitable communications link such as the illustrative radio link 22. It should be understood, however, that the radio link 22 is illustrative only and that other communications links are also suitable such as fiber-optics, land lines, power-line carrier, etc. Additionally, in specific embodiments and in accordance with the particular operating practices of the particular power distribution network, the control apparatus 10 also communicates with a master station 30 via the radio link 22 or other communications link, e.g. for remote supervisory control, reconfiguring of the network, monitoring of local parameters, updating of network configuration information, etc. However, it should be realized that the master station 30 is not required to practice the present invention and perform the fault-isolating function.

Figure 2:
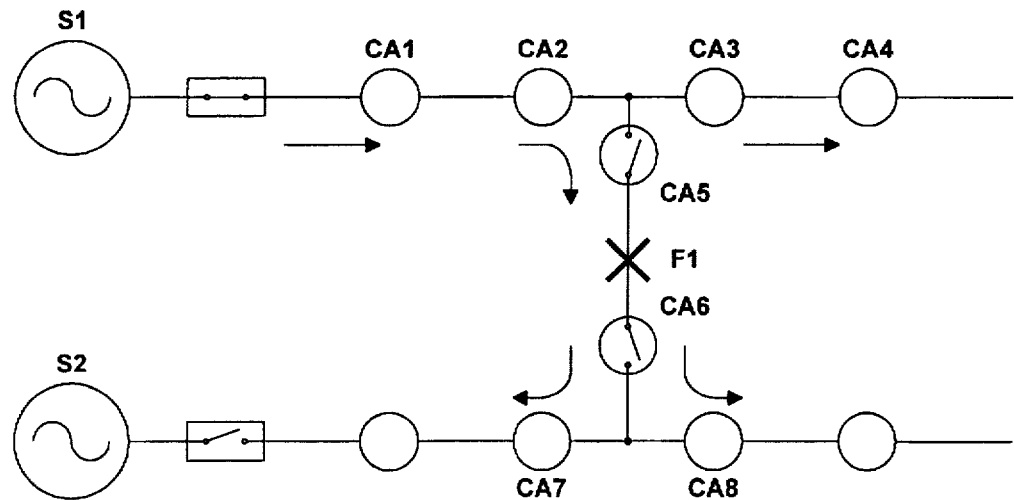
FIGS. 2 and 3 are diagrammatic representations of electrical power distribution networks illustrating the use and operation of the present invention of FIG. 1.

In accordance with important aspects of the present invention, the control apparatus 10 is responsive to sense fault conditions and communicate the existence of the fault condition to other control apparatus in the network, the plurality of control apparatus determining the appropriate sectionalizing switches to be operated to isolate the fault condition. With additional reference to FIG. 2, a plurality of control apparatus 10, designated CA1–CA8 are located at particular points in the network 20, each controlling a respective sectionalizing switch 18, designated SW1–SW8.

If a fault condition occurs at F1, the fault is sensed by the control apparatus CA1, CA2, and CA5. Each of the control apparatus CA1, CA2, and CA5 communicates the detection of the fault condition F1 to its respective network neighbors. For example, a map of the network neighbors for each of the control apparatus 10 is stored within the control apparatus 10 (or otherwise provided thereto, e.g. via the communication link 22). In a specific embodiment, the neighbors are defined as source-side and load-side neighbors for various configurations of sources and direction of power flow. For example, a "source-side" neighbor is defined as one that detects the overcurrent followed by a loss of voltage. Thus, in the illustrative example, the stored map of neighbors for CA5 would be source-side neighbors CA2 and CA3 and load-side neighbor CA6. For a reverse direction of current flow, the loadside neighbors to CA5 would be CA2 and CA3, while the source-side neighbor would be CA6.

In one specific embodiment, the control apparatus 10 that detects the fault condition, CA1, CA2, and CA5 in the illustration, communicates an opening inhibit ("block open") signal to each of its source-side (upstream) neighbors, e.g. CA2 sends this inhibit signal to CA1, and CA5 sends the inhibit signal to CA2. In this way, CA1 and CA2 are inhibited from opening their respective sectionalizing switches SW1 and SW2, since this would not be desirable from a sectionalizing philosophy, i.e. this would not serve to isolate the faulted section in a desired manner so as to deenergize the smallest possible number of users and portions of the network. If a second source S2 were connected in the network 20, the control apparatus CA3 and CA4 would also detect the fault at F1. In that case, CA3 would send an inhibit signal to CA4, and CA5 would send an inhibit signal to CA3. Further, each of the control apparatus 10 that detected the fault and does not receive an inhibit signal is arranged to open its respective sectionalizing switch, e.g. CA5 opens its respective sectionalizing switch SW5 (during a sensed zero voltage condition, e.g. during the open time of the recloser) so as to appropriately isolate the faulted section around F1 from the source S1.

In accordance with important aspects of the present invention, in a specific arrangement which is preferred for most network configurations, each control apparatus that detects the fault and does not receive an inhibit signal is also arranged to send an open signal to its load-side neighbors. Thus, in the illustrative example, CA5 does not receive an inhibit signal and sends an open signal to CA6, since CA6 is the load-side neighbor of CA5. Accordingly, both CA5 and CA6 open their respective sectionalizing switches. In this manner, if restoration of the circuit following the fault is via a network configuration that utilizes different sources and power flow directions as compared to the original configuration, the faulted section is properly isolated via the additional opening of SW6 (which also prevents any backfeed into the faulted section regardless of the source). If source S2 were feeding the network and source S1 was not connected, then with a fault at F1, control apparatus CA6 would detect the fault, inhibit opening of CA7, send an open signal to CA5, and both CA5 and CA6 would open their switches SW5 and SW6.

Figure 3:
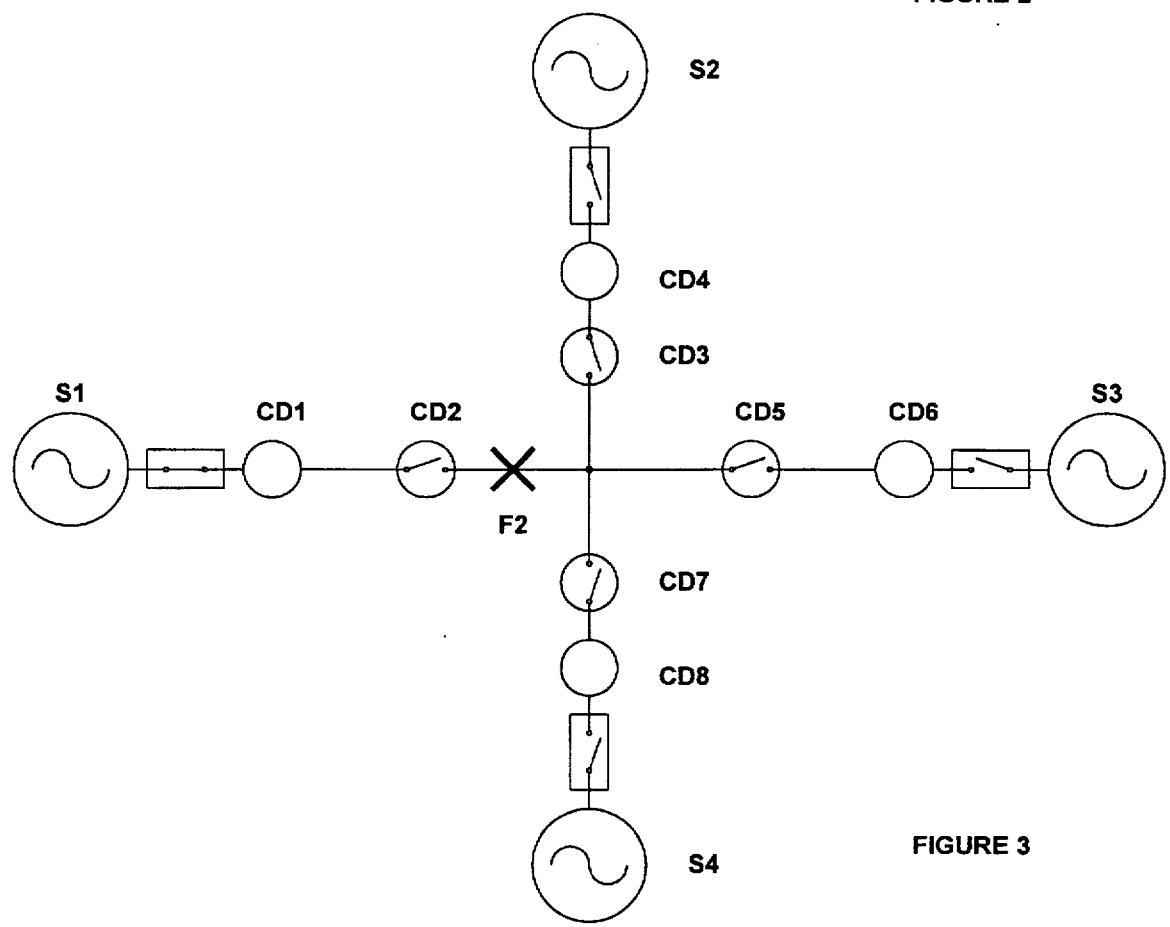

Referring now to FIG. 3, a network 35 is illustrated including control apparatus CD1 to CD8 with the network 35 being fed by the source S1. If a fault occurs at F2, control apparatus CD1 and CD2 detect the fault. Control apparatus CD2 sends an inhibit signal to its source-side neighbor, CD1, and proceeds to open its sectionalizing switch SW-2 when the voltage is zero. Additionally, CD2 sends an open signal to its downstream neighbors CD3, CD5, and CD7, which respond to open their respective sectionalizing switches SW3, SW5, and SW7. Further, CD1 did not open its switch since it received the inhibit signal from CD2. Thus, the fault F2 is then isolated. Accordingly, if circuit restoration occurs via energizing of such sources as S2, S3, and/or S4, the fault is isolated.

Figure 4:
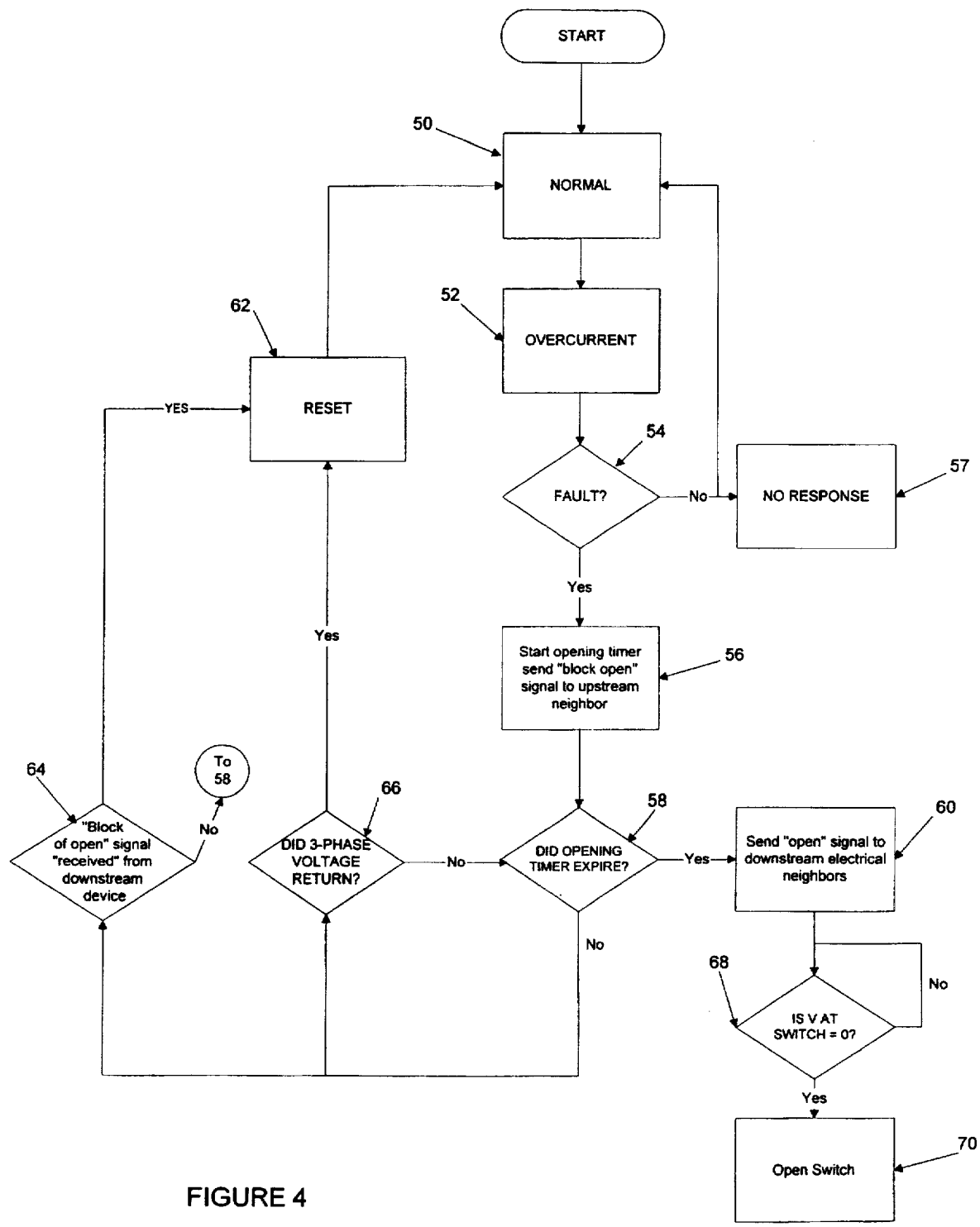
FIG. 4 is a flow diagram illustrating operation of the control apparatus of FIG. 1.

With reference now to FIG. 4, a flow diagram is shown that is suitable for the practice of the present invention to control the control apparatus 10 and to accomplish the isolation of the fault conditions in the network. The flow diagram remains in the Normal condition or state at 50 until an overcurrent is detected. When an overcurrent condition is detected, program flow continues from an Overcurrent block 52 to a Fault decision block 54 where the determination is made as to whether or not the overcurrent satisfies predetermined criteria that define a fault condition. If a fault is detected, program flow proceeds to a function block 56 which starts an opening timer and senses the inhibit ("block open") signal to upstream neighbors. If a fault is not detected in decision block 54, program flow then proceeds to a no response state at 57 with a return to the Normal block 50. Continuing with the program flow for a detected fault, from function block 56, the program flow proceeds to a decision block 58 wherein the determination is made as to whether or not the opening timer duration has expired. If the determination is yes, program flow proceeds to a function block 60 to perform the sending of the open signal to downstream neighbors, and then to open the switch when the voltage is zero, as represented by the program flow through decision block 68 and an open switch function block 70. When the switch is opened in function block 70, the program flow awaits further instruction (via either manual input or input from the communication link) to reset via the reset function 62. On the other hand, if the opening timer did not expire, the program flow returns to the Normal state at 50 via a Reset function block 62 by one of two paths. A first path results when a block open signal is received via decision block 64. A second path to the Reset function block 62 can result when the return of three-phase voltage is detected via a decision block 66.

While there have been illustrated and described various embodiments of the present invention, it will be apparent that various changes and modifications will occur to those skilled in the art. Thus, the present invention encompasses other specific implementations to achieve opening of the appropriate sectionalizing switches in a network in response to a fault via the communication between control apparatus at neighboring switch locations.

Accordingly, it is intended in the appended claims to cover all such changes and modifications that fall within the true spirit and scope of the present invention.

What is claimed and desired to be secured by Letters Patent of the United States is:

1. An arrangement for isolating a faulted section of a power distribution network comprising:

a plurality of control apparatus located at particular points in the distribution network, each of said plurality of control apparatus comprising detecting means for detecting fault conditions, first means responsive to said detecting means for communicating with predetermined source-side and load-side control apparatus in the power distribution network, and second means responsive to said detecting means and communications received from other of said plurality of control apparatus for providing a sectionalizing switch-opening signal to an associated sectionalizing switch and adjacent load-side control apparatus, said second means further comprising third means for providing an inhibit signal to predetermined source-side control apparatus so as to prevent the source-side control apparatus from providing a sectionalizing switch-opening signal.

2. The method of claim 1 wherein the control apparatus is responsive to the direction of current through its respective sectionalizing switch.

3. A method for isolating a faulted section of an electrical power distribution network which includes a plurality of control apparatus at predetermined locations along the power distribution network each of which includes provisions for detecting fault conditions and selectively controlling the opened or closed status of a respective sectionalizing switch, the method comprising the steps of:

detecting a fault condition by each of the control apparatus on the source side of the fault condition;

each of the control apparatus that detects a fault condition communicating an inhibit signal to predetermined source-side control apparatus so as to prevent the source-side control apparatus from opening the sectionalizing switch; and each of the control apparatus that detects a fault condition and that does not receive an inhibit signal controlling the opening of its respective sectionalizing switch.

4. The method of claim 3 further comprising the step of sensing by each control apparatus the direction of current through its respective sectionalizing switch.

5. The method of claim 4 further comprising the step of sending a sectionalizing switch-opening signal to predetermined load-side control apparatus by the control apparatus that detects a fault condition and that does not receive an inhibit signal.

6. The method of claim 5 further comprising the step of storing within each control apparatus information representing the predetermined source-side and load-side control apparatus.

7. A method of isolating a faulted section of a power distribution network having sectionalizing apparatus with a respective associated switch at predetermined locations in the power distribution network, each of the sectionalizing apparatus detecting fault conditions including the direction of current, being capable of communicating with one or more predetermined neighboring sectionalizing apparatus, and being responsive to received open and open-inhibit signals, the method comprising the steps of:

sending an open-inhibit signal by each sectionalizing apparatus that detects a fault condition to its respective predetermined neighbors that are determined to be upstream of the fault condition;

each sectionalizing switch that detects a fault condition opening its respective associated switch a predetermined time interval after the detection of a fault condition unless an open-inhibit signal is received; and each sectionalizing switch that detects a fault condition and does not receive an open-inhibit signal sending an open signal to the predetermined neighbors that are determined to be downstream of the fault condition.

* * * * *